(12) United States Patent
Aylward et al.

(10) Patent No.: US 6,895,158 B2
(45) Date of Patent: May 17, 2005

(54) WAVEGUIDE AND METHOD OF SMOOTHING OPTICAL SURFACES

(75) Inventors: Peter T. Aylward, Hilton, NY (US); Thomas M. Smith, Spencerport, NY (US); Daniel A. Slater, Rochester, NY (US); Arunachalam T. Ram, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 239 days.

(21) Appl. No.: 10/314,661

(22) Filed: Dec. 9, 2002

(65) Prior Publication Data
US 2004/0109659 A1 Jun. 10, 2004

(51) Int. Cl.⁷ .................................................. G02B 6/00
(52) U.S. Cl. ........................ 385/133; 385/120; 385/901
(58) Field of Search .................... 385/15, 116, 120–121, 385/129–133, 901

(56) References Cited

U.S. PATENT DOCUMENTS

| 5,381,502 | A |   | 1/1995 | Veligdan | 385/115 |
| 5,625,736 | A |   | 4/1997 | Veligdan | 385/120 |
| 6,002,826 | A |   | 12/1999 | Veligdan | 385/120 |
| 6,222,971 | B1 |   | 4/2001 | Veligdan et al. | 385/120 |
| 6,301,417 | B1 | * | 10/2001 | Biscardi et al. | 385/120 |
| 6,307,995 | B1 |   | 10/2001 | Veligdan | 385/129 |
| 6,317,545 | B1 |   | 11/2001 | Veligdan | 385/120 |
| 6,327,416 | B1 |   | 12/2001 | Veligdan | 385/901 |
| 6,485,838 | B1 |   | 11/2002 | Shimada et al. | 428/429 |
| 2002/0146909 | A1 |   | 10/2002 | Yang et al. |   |

* cited by examiner

Primary Examiner—Phan T. H. Palmer
(74) Attorney, Agent, or Firm—Arthur E. Kluegel

(57) ABSTRACT

Disclosed is a waveguide having a light inlet surface and a viewing surface comprising stacked core layers separated by clad layers to form channels and bearing a smoothing layer on at least one of the light inlet surface or the viewing surface thereof.

25 Claims, 6 Drawing Sheets

WAVEGUIDE AND METHOD OF SMOOTHING OPTICAL SURFACES

FIELD OF THE INVENTION

This invention relates to a stacked waveguide having a light inlet surface and a viewing surface bearing a smoothing layer on at least one of the light inlet surface or the viewing surface thereof, and a method of making a display screen.

BACKGROUND OF THE INVENTION

Optical screens typically use cathode ray tubes (CRTs) for projecting images onto the screen. The standard screen has a width to height ratio of 4:3 with 525 vertical lines of resolution. An electron beam is scanned both horizontally and vertically across the screen to form a number of pixels, which collectively form the image.

Conventional cathode ray tubes have a practical limit in size, and are relatively deep to accommodate the required electron gun. Larger screens are available which typically include various forms of image projection. However, such screens have various viewing shortcomings including limited viewing angle, resolution, brightness, and contrast, and such screens are typically relatively cumbersome in weight and shape. Furthermore, it is desirable for screens of any size to appear black in order to improve viewing contrast. However, it is impossible for direct view CRTs to actually be black because they utilize phosphors to form images, and those phosphors are non-black.

Optical panels used for viewing images may be made by stacking waveguides. Such a panel may be thin in its depth compared to its height and width, and the cladding of the waveguides may be made black to increase the black surface area. It is known in the art that waveguide component are utilized for transmission of light. It is further known in the art that a waveguide has a central transparent core that is clad with a second material of a lower refractive index. In order to provide total internal reflection of light within this waveguide, the central core has a higher refractive index of refraction than the clad. By adjusting the difference in refractive index the acceptance angle of incoming light may be varied. The larger the difference in refractive index, the larger the incoming light acceptance angle.

However, optical waveguides of the step index cladding type that are stacked and fused together have some significant drawbacks. In the formation of a large optical panel using stepped index clad waveguides many layers are stacked on top of each other and adhered to each other. In a typical 50" diagonal screen there may be several hundreds or even thousands of waveguides that are adhered to one another. Handling and cutting many strips of thin polymer is very difficult. The compatibility of materials that have a refractive index difference from core to clad is limited. This may contribute to problems such as inadequate adhesion between layers. Such incompatibility may result in layer to layer interface problems such as air gaps, rough surfaces, or layer separation. These types of problems may cause a loss of light at each bounce at the interface between the core layer and surrounding cladding layers. Furthermore when stacked, fused and saw cut, panels that are made from large blocks, may have an additional problem with the light inlet and light viewing side of the panel. These surfaces typically are very rough and non-uniform and they interfere with the light entering and leaving the waveguide. Typically the rough non-uniform surface result in light scattering and haze problems that reduce the viewing clarity of the image. Therefore, the amount of light loss that occurs in optical panels becomes a significant detriment to the overall efficiency and performance of the optical panel, as well as the quality, such as brightness and sharpness, of the image. It is desirable to find a means to improve the viewing clarity, sharpness and brightness of the image.

There are a limited number of materials that can be used in combination between the core and clad that provide the desired delta refractive index, that provide adequate adhesion between the layers and are capable of absorbing ambient room light, and are also light in weight. These limitations have resulted in the need to use plastic polymer in place of glass. While stacking and fusing together many layers of plastic is relatively easy, there are many problems when individual panels are cut. Both the inlet and viewing surface are rough and need to be ground and polished in order to provide a surface that does not interfere with the luminous flux of light. Grinding and polishing plastics is difficult to control. It is important to have a means of controlling or modifying the inlet and viewing surface smoothness of the cut panels to assure that the optical characteristics are optimized. In stepped refractive index clad waveguides of the type described in U.S. Pat. Nos. 6,002,826, 6,301,417 and 5,625,736 it is important to control the surface smoothness of the optical panel. In these patents a means of polishing with diamonds is discussed. There remains a need for improved control of surface smoothness that is less labor intensive and time consuming.

It is a problem to be solved to provide improved waveguides that have a smooth inlet surface and viewing surface that can be obtained without excessive grinding and polishing.

SUMMARY OF THE INVENTION

The invention provides a waveguide having an light inlet surface and a viewing surface comprising stacked core layers separated by clad layers to form channels and bearing a smoothing layer on at least one of the light inlet surface or the viewing surface thereof. The invention also includes a display screen employing such a waveguide. The invention also includes a method for providing a smooth surface on a waveguide.

The invention provides improved waveguides that provide excellent viewability without excessive grinding and polishing of the surfaces.

DETAILED DESCRIPTION OF THE INVENTION

Figure 1:
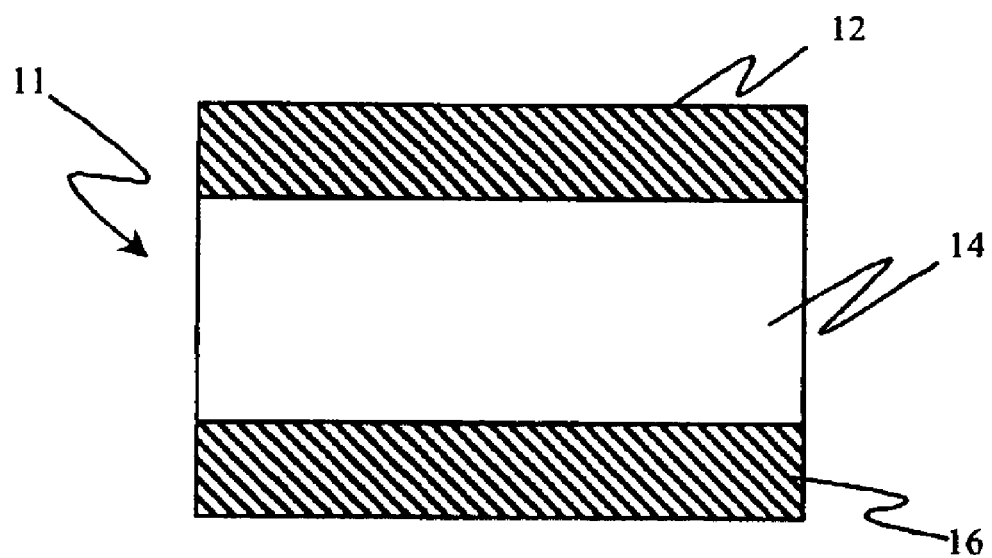
FIG. 1 is a stepped waveguide used in flat planar waveguide projection screens

The invention provides a means to control or modify the surface smoothness of the light inlet and viewing surfaces of a stacked laminated optical waveguide and greatly reduce or eliminate the need to grind and polish the surfaces. The stacked waveguides primarily consist of a central transparent core that has a clear clad layer of lower refractive index material on each side of the core and a clad cap layer that is opaque for light absorption and is also an adhesive that binds several individual waveguide channel together to form a screen. Polishing plastics and in particular multiple plastic and adhesives layers that are fused together and that have different levels of hardness is very difficult to control and usually requires many polishing steps with finer and finer slurry grits to obtain the desired surface smoothness. This invention provides a means to optically fill surface scratches, digs and other surface non-uniformities that reduce optical performance in a flat planar waveguide.

The invention has numerous advantages. It provides a means and materials for optically smoothing the light inlet and viewing surface and therefore minimizing the luminous flux losses due to light scattering and eliminating hazy blurred images. This invention provides a flat planar waveguide having a light inlet and a viewing surface made from stacked core layers separated by clad layers that form channels and bears a smoothing layer on at least one of the light inlet or the viewing surface thereof. Such an embodiment has significant advantages over the prior art that discloses optical polishing steps that are very time consuming and labor intensive. Furthermore it should be noted that polishing plastics tends to create microscracthes and digs. Polishing plastics is also very labor intensive and requires repeated steps of polishing with finer and finer grids to obtain a useful optical surface. Laminated stacked waveguides are even more difficult to polish because of their non-homogenous construction. Since different layers have different sensitivity to polishing grit hardness and have different softening points, it is very easy to create optical imperfections. One such imperfection may be related to smearing fine particles of the black clad material onto the surface of the transparent core resulting in poor luminous flux. It may be possible to eliminate all or most of these grinding and polishing steps and provide a pleasing viewing or inlet surface that will enhance the viewability of an image or information that is projected through a stack flat planar waveguide. Such smoothing layers are effective on waveguides that have a uniform refractive index in the core as well as gradient refractive index cores and clads as well as waveguides with telecentric and non-telecentic light inlet surfaces Application of a liquid layer to the viewing and/or light inlet side of a laminated waveguide screen, which can subsequently be solidified in place, is proposed as an embodiment of this invention as a finishing operation to provide a transparent smooth, "glass-like" surface to a waveguide screen. It is proposed as either an additional operation to a ground and polished surface or a replacement for these labor-intensive procedures. Self leveling and hardenable materials are also disclosed as embodiments of this invention.

Critical properties of such a material include a viscosity that is sufficiently low to provide good wetting and gap-filling capabilities to insure that all crevices, scratches, digs and other surface non-uniformities are filled with material. Yet the viscosity should not be so low that it runs off the surface of the screen without providing sufficient thickness, or that it "wicks" into the interlayers of the laminate and destroys the optical function of the waveguide. Another key property is that it be essentially 100% reactive in order to minimize shrinkage during the curing process. In addition, the cured layer should exhibit adequate adhesion to the underlying structure and be optically clear and colorless with an index of refraction that does not impair the function of the optical waveguide. Other desirable features include the ability to be formulated, applied, and cured in a relatively easy and inexpensive manner, and that it possess a low order of toxicity.

The smoothing layer may further comprise material to modify its refractive index such as a material selected from the group consisting of fluorinated polymer and transparent inorganic particles.

Two classes of material are considered as having potential for this application. One is the use of a two-part epoxy formulation that could cure at room temperature or be accelerated with heat. Second is the use of a radiation-curable formulation that could be cured upon exposure to ultraviolet (UV) radiation. Each has its own advantages and limitations, but either could be employed for this application.

Because of their epoxide, hydroxyl, amine, or other polar groups, epoxies have high specific adhesion to a wide variety of materials. They can be formulated in a wide range of viscosities. Epoxies are 100% reactive, therefore there are no volatile materials to contend with, nor are there any condensation by-products released. In addition, they cure with minimal shrinkage. Since they form thermosetting structures after curing, by definition they are resistant to elevated temperatures, moisture and organic solvents. Epoxies can be formulated for use in cryogenic applications or for continuous use at temperatures exceeding 260° C. They can be formulated to cure within five minutes at room temperature, or provide a pot-life of several hours.

Deficiencies of epoxy formulations include a moderate degree of toxicity (of unreacted components) and the limited pot-life of mixed systems. Some epoxies and diluents are known to cause dermatitis and some amine curing agents are toxic. However, fully cured epoxies pose no health concerns. Being two-component systems, epoxy formulations must be mixed shortly before use. There is a finite time during which the formulation can be used and once it begins to cure, it can be difficult if not impossible to remove from mixing and application equipment. These deficiencies are more than offset with the improved optical performance of the screen.

Radiation curable formulations can also be formulated in a wide range of viscosities. Like epoxy formulations these too are 100% reactive and they cure with minimal shrinkage. However, these single component systems have the distinct advantage of rapid curing time when compared to epoxies. Additionally, since they will not begin to cure until exposed to ultraviolet light, pot life or "open time" is unlimited and clean up of uncured resin is much easier. Adhesion to most plastics is excellent. They also offer an advantage with respect to clarity, and refractive index matching.

Potential deficiencies of UV-curable formulations include the additional expense of an UV light source required for their use. Proper exhaust of ozone generated by the lamp unit must also be dealt with. UV-cured formulations also exhibit a finite "depth of cure" which may limit thicker applications. Additionally, the presence of oxygen may inhibit the curing mechanism of some formulations. And, like epoxies, the potential toxicity of many of the monomers generally used in this type of formulation may pose health risks.

Typically curing is initiated by exposure to radiation having a wavelength within the region of 200–400 nm, although maximum absorption between 320–380 nm is most effective. The recommended energy required for cross-linking most systems is a minimum of four Joules/cm$^2$ of long wavelength UV light.

It should also be noted that both epoxies and radiation curable materials may be used with other materials to modify their optical properties such as raising or lowering their refractive index to better match their performance to the waveguide core or to a light shaping or directing film that may be added to the waveguide screen. Materials may also be added to improve the hardness of the outer surface.

For the purpose of this invention FIG. 1 is a stepped waveguide 11 with transparent core 14 and top clad 12 that has a lowered refractive index than the core and also is opaque and contains an adhesive and lower clad 16 that has a lowered refractive index than the core and also is opaque and contains an adhesive.

Figure 2:
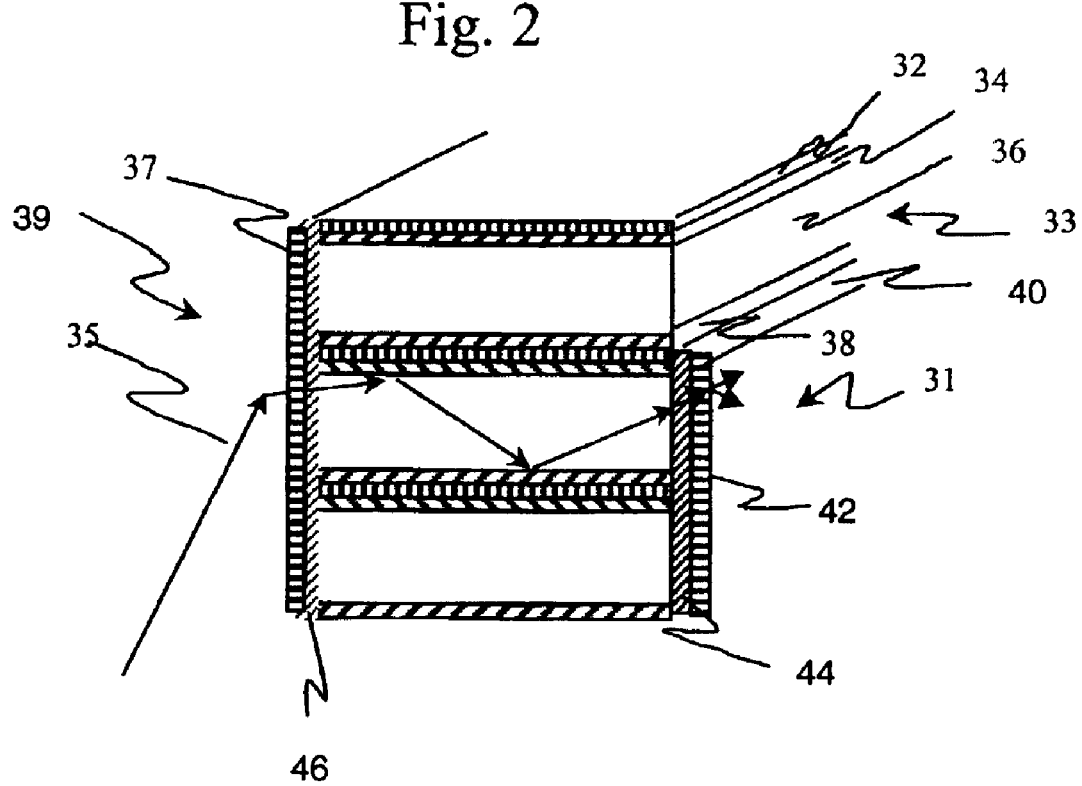
FIG. 2 is a stacked waveguide rear projection screen

FIG. 2 is a stacked waveguide rear projection screen 39 consisting of a view side 31 and several waveguides 33 that have a transparent central core 36, a top clear clad 34 with a top black clad/adhesive layer 32 and bottom clear clad 38 with a bottom clad cap with adhesive layer 40. After several stacks of waveguide 33 are adhered together a leveling layer 46 is applied to the light inlet side of stacked waveguide 39 and a leveling layer 44 is applied to the viewing side of the waveguide. Layer 37 is a light directing film that is adhered to the inlet side of the stacked waveguide and layer 42 is a light shaping film that is adhere to the viewing side of the stacked wavguide. The light shaping film 42 is used to control the vertical and horizontal-viewing plane of the projected light. Light directing film 37 is a means of turning light such that it enters the waveguide within a few degrees of normal to the core of each waveguide 33. Light ray 35 is shown to depict light coming from a projection source that enter light directing film 37 and is turn to with a few degrees of normal and is internally reflected within the core of the waveguide 36 until it exits through a leveling layer 44 and light shaping film 42.

Figure 3:
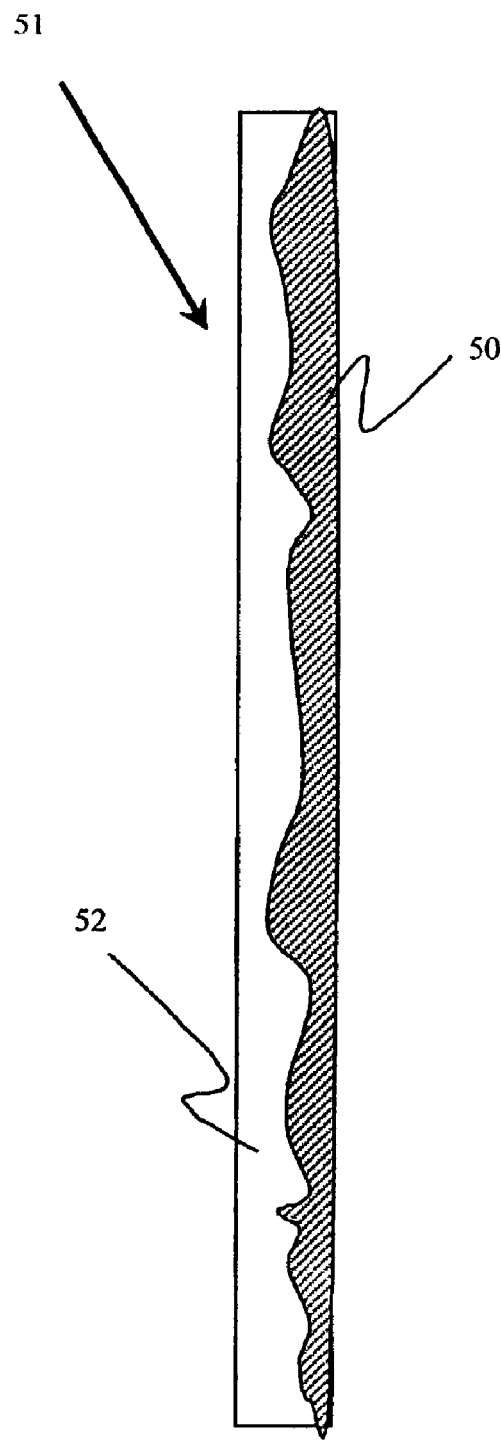
FIG. 3 depicts a rough waveguide segment with smoothing layer

FIG. 3 depicts a waveguide 51 whose rough surface 52 has been leveled with a two-part epoxy or a UV-curable leveling coat 50 to provide an optically smooth surface for improved viewing clarity.

Figure 4:
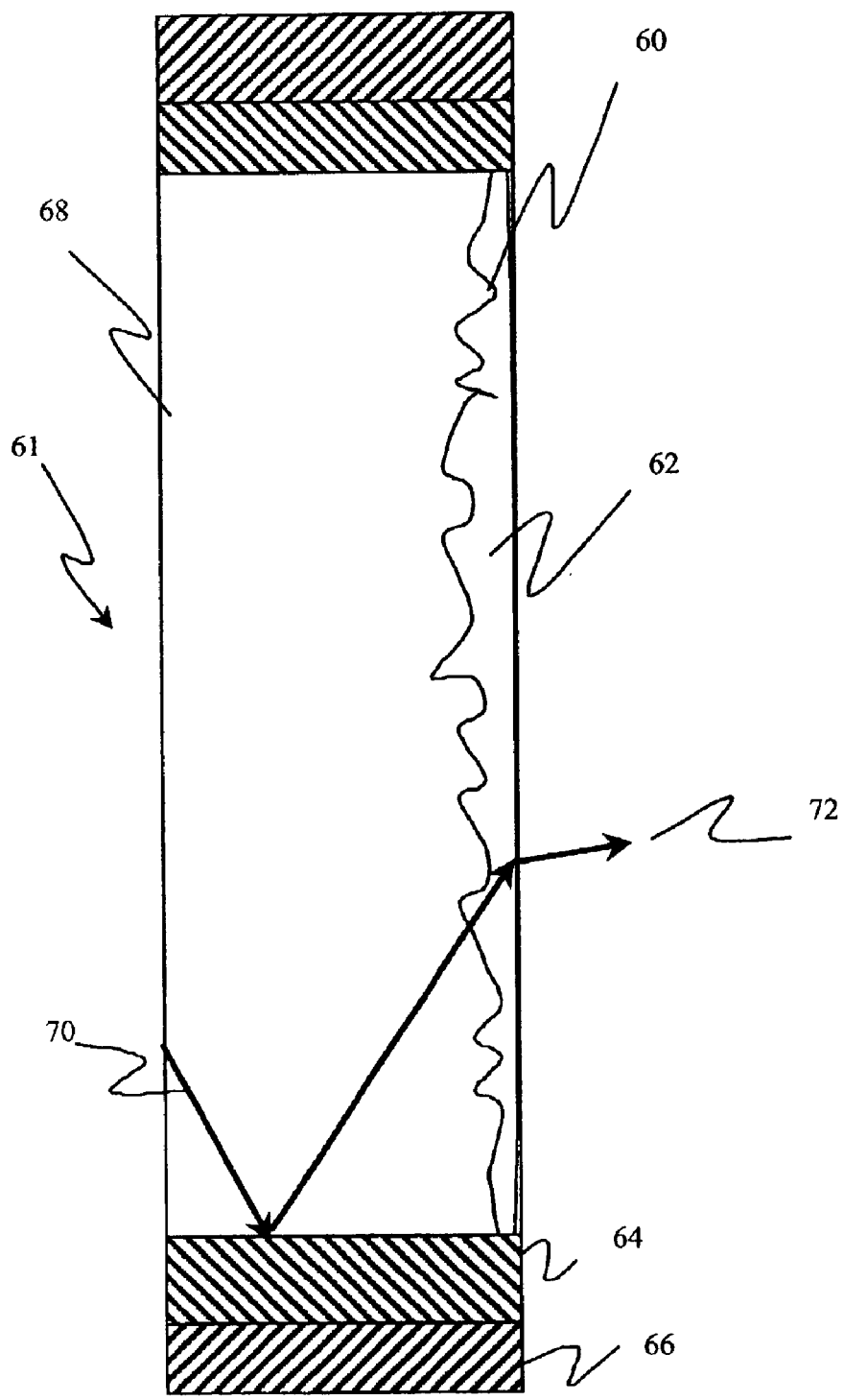
FIG. 4 depicts a section of a stepped waveguide with boundary that represents a magnified roughness of the transparent core with a smoothing layer and the impact on a light ray

FIG. 4 depicts a section of a stepped waveguide 61 with a clear cladding 64 that has a lower refractive index than the transparent core 68. Layer 66 is part of the clad layer but contains a black opaque material and provides adhesion when waveguide 61 is stack on top of other waveguide to form a screen. The boundary show by dotted line 60 represents a magnified roughness of the transparent core 68 that has a smoothing layer 62 of the same refractive index as the core material 68. As light ray 70 travel through the transparent core 68 and reflects off the lower refractive index clad 64 and passes through the dotted line boundary 60 and smoothing layer 62 until it exits the core of the waveguide. Since the rough surface of the waveguide 60 and the smoothing layer 62 are of the same refractive index the light is not refracted at the interface and therefore there is no light loss.

Figure 5:
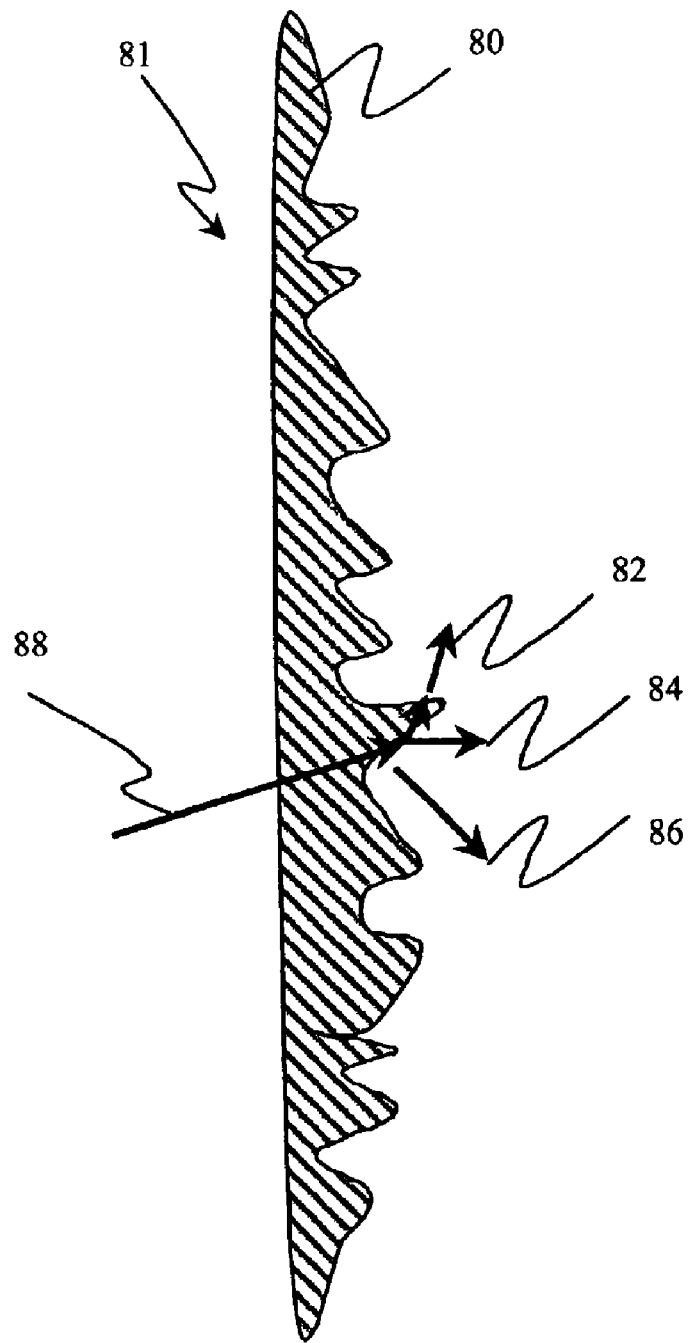
FIG. 5 depicts a magnified section of waveguide transparent core with a rough surface without a smoothing layer and the impact on light as it encounters the rough surface.

FIG. 5 depicts a magnified section of waveguide core 81 with a rough surface section 80 and light ray 88 travelling through the core until it hits the rough surface and is refracted into light ray segments 82, 84 and 86. Such refraction causes light losses and reduces the sharpness and clarity of the image.

Figure 6:
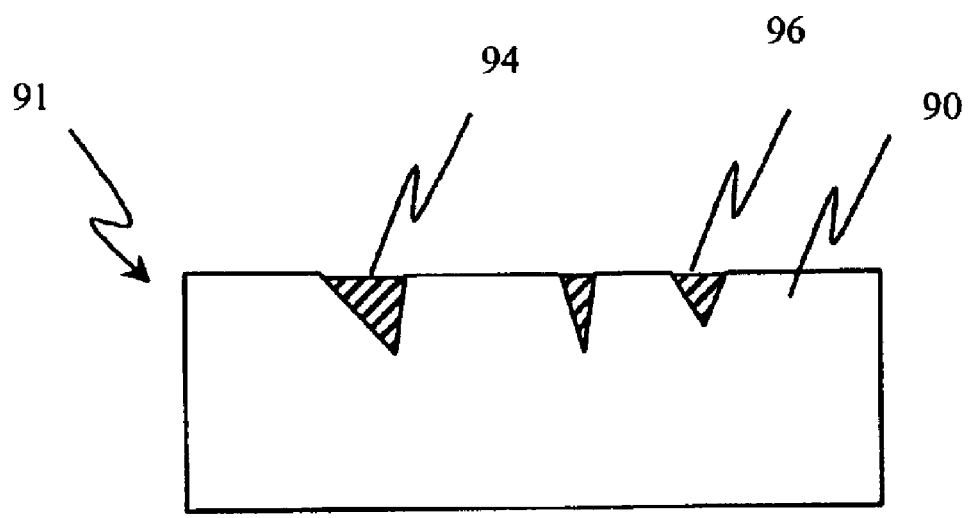
FIG. 6 depicts a waveguide transparent core with a non-continuous layer that fills digs or scratches.

FIG. 6 is a representation of a waveguide with scratches and digs with a non-continuous leveling layer 91. Transparent core 90 has been leveled with a non-continuous filler as shown by scratch 92 and dig 94.

The behavior of light entering a material is fundamentally controlled by the property of the material. Perhaps the most important property for waveguiding is to understand the refractive index. The refractive index of a material is the ratio of the velocity of propagation of an electromagnetic wave in vacuum to its velocity in the medium. The refractive index (n) of a substance is defined as:

$$n = V_v/V$$

where $V_v$ is the velocity of light in a vacuum, and V is the velocity of light in the substance. In general light slows down when it enters a substance, so the refractive index will always be greater than 1. Most materials have refractive indices between 1.32 and 2.40, with values between 1.40 and 1.80 being of the most interest for this invention. In should also be noted that the refractive index of some materials is not necessarily the same in all directions. The internal symmetry of a material is a reflection of the orientation of atoms into layers. The arrangement of the atoms determines how light interacts with the material. Two basic types of behavior are exhibited:

1. Isotropic—same properties (refractive index) in all directions exhibit the same physical properties regardless of where the light enters the crystal
2. Anistropic—different properties (different refractive index) in different directions. These materials are either uniaxial that have two refractive indices in the length direction and width of a sheet or biaxial that are characterized by three refractive indices. These materials add a third refractive index in the thickness plane of the material.

Light entering a wavequide follows Snell's law. Snell's law of geometric optics defines the amount of bending that takes place when a light ray strikes a refractive boundary, e.g. an air-glass interface or the interface of two different polymers, at a non-normal angle.

$$\text{Snell's Law } n_{air} * \sin \alpha = n_r * \sin \beta$$

Snell's law states that where $n_{air}$ is the index of refraction of the material in which the light ray travels, a is the angle, with respect to the normal at the refractive boundary, at which the light ray strikes the boundary, $n_r$ is the index of refraction of the material in which the refracted ray travels, and b is the angle, with respect to the normal at the refractive boundary, at which the refracted ray travels. The light ray and refracted ray travel in the same plane, on opposite sides of the normal at the point of incidence. If a ray travels from a material of lower refractive index into a medium of higher refractive index, it is bent toward the normal; if it travels from a medium of higher refractive index to a medium of lower index, it is bent away from the normal. If the light ray travels in a material of higher refractive index toward a material of lower refractive index at such an angle that Snell's law would call for the sine of the refracted ray to be greater than unity (a mathematical impossibility). As a result, the "refracted" ray in actuality becomes a reflected ray and is totally reflected back into the medium of higher refractive index, at an angle equal to the incident angle (and thus still "obeys" Snell's Law). This reflection occurs even in the absence of a metallic reflective coating (e.g. , aluminum or silver). This phenomenon is called total internal reflection. The smallest angle of incidence, with respect to the normal at the refractive boundary, which angle will support total internal reflection, is called the critical angle. In other words total internal reflection is the reflection that occurs when light, in a higher refractive index material, strikes an interface, with a medium with a lower refractive index, at an angle of incidence (with respect to the normal) greater than the critical angle.

The critical angle is defined in geometric optics as the smallest angle of incidence at which total internal reflection occurs. The angle of incidence is measured with respect to the normal at the refractive boundary. The critical angle is given by $$\beta = \sin^{-1}(n_c/n_r)$$

where $\beta$ is the critical angle, $n_c$ is the refractive index of the less dense material and $n_r$ is the refractive index of the denser medium.

Geometric optics is the branch of optics that describes light propagation in terms of rays. Rays are bent at the interface between two dissimilar materials. A refracted ray is a ray that undergoes a change of velocity, or in the general case, both velocity and direction, as a result of interaction with the material in which it travels. The speed of light is not constant. It varies as it passes through different transparent substances. Light travels more slowly through air than it does through the vacuum of empty space, more slowly through water than air, slower yet through quartz, and slower yet through diamond. The speed of light is equal to its wavelength times its frequency. As light passes through different substances or materials (polymers) its frequency remains constant and its wavelength changes. This change of wavelength (speed) at the surface interface between different materials causes light passing through one and into the other to be bent.

The refractive index for any substance is the ratio of the velocity of light in a vacuum to its velocity in the substance. It is also the ratio of the sine of the angle of incidence to the sine of the angle of refraction ASTM D642. Some typical refractive indexes of material are: Fluorcarbon (FEP) 1.34, Polytetrafluoroethylene (PTFE) 1.35, Chlorotrifluoroethylene (CTFE) 1.42, Cellulose Acetate Propionate 1.46, Cellulose Acetate Butyrate 1.46–1.49, Cellulose Diacetate 1.46–1.50, Polymethylpentene 1.485, Ethyl Cellulose 1.47, Polyacetal 1.48, Acrylic 1.49, Cellulose Nitrate 1.49–1.51, Polypropylene (Unmodified) 1.49,-Polyallomer 1.492, Polybutylene 1.50, Ionomers 1.51, Polyethylene (Low Density) 1.51, Nylon (polyamide) Type II 1.52, Acrylic Multipolymers 1.52, Polyethylene (Medium Density) 1.52, Styrene Butadiene Copolymers 1.52–1.55, Polyvinyl Chloride 1.52–1.55, Nylons (Polyamide) Type 6/6 1.53, Urea Formaldehyde resins 1.54–1.58, Polyethylene (High Density) 1.54, Styrene Acrylonitrile Copolymer 1.56–1.57, Polystyrene, 1.57–1.60, Polycarbonate 1.586, and Polysulfone 1.59. As can be noted from this information many polymers that might be used for waveguiding have refractive indexes that are fairly close together.

By providing a substantially matched refractive index smoothing layer on the inlet and viewing surfaces of a stacked waveguide that has a rough surface; light losses due to refracted rays can be significantly reduced or eliminated. In the prior art disclosures for making flat planar waveguides index matched layers are suggested as adhesion layers for other functional films but the only method of providing a smooth surface for the inlet and viewing surfaces of the waveguide is to grind and polish the layers. This method while effective is very time consuming and has many problems when the waveguide core is plastic and adhesive layer are used to fuse the individual waveguide together to form a screen. Trying to grind and polish plastic surfaces and in particular a surface that has different materials with different hardness values creates a number of problems. Typically the adhesive has a lowered Tg than the core polymer and it will soften and smear into fine scratches and digs in the transparent core. This results in optical luminous flux interference and loss of image clarity. In order to control materials of this type, the grinding or polishing process temperature must be held below the Tg of the material. This requires lower pressures and takes a long time. Screens of this type may also need to be hand polished to assure good optical properties. Providing a liquid applied smoothing layer allows the material to flow into the scratches and other non-uniform areas and provide light with a seamless interface. These materials and this process of flooding the surface with a self leveling material that can be hardened provides a means of eliminating or significantly reducing the amount of grinding and polishing required to make a fully functional waveguide screen. The process of providing an index matched adhesive as disclosed in the prior art is achieved with a preformed adhesive layer that is laminated to the surface of the waveguide. Such a process does not provide sufficient leveling of the surface and may leave small air bubbles or other artifacts that will create light losses and detract from the viewing pleasure of the screen.

Whenever used in the specification the terms set forth shall have the following meaning:

Light Inlet shall mean the surface or side of a stacked waveguide in which light enters from projected source.

Viewing Surface shall mean the surface or side of a waveguide in which an image or information is observed.

Core layer shall mean a layer of polymer or glass in which light is guided.

Clad layer shall mean a layer or layers that are applied to a core layer and have a lower refractive index than the core layer. In some waveguide constructions there may be more than one clad layer and there may be an opacifying material added to the clad.

Clad cap layer shall mean an opaque layer that also is an adhesive that is adjacent to the clear clad layer.

Smoothing layer shall mean a layer of polymer that is applied to either or both the inlet and viewing surface of a stack waveguide and whose resulting surface is smoother than the surface prior to application of polymer. The layer may be non-continuos and the polymer may be a scratch or dig filler.

Leveling layer shall mean the same as smoothing layer.

Light directing film shall mean a film that has the ability to bend or change the direction of light. Typical examples may include but are not limited to Fresenl lens and grooves, both simple and compound lens or prismatic shapes.

Radiation curable monomer shall mean a material or materials that harden by means of chemical crosslinking initiated by ultraviolet or electron-beam radiation.

Ra shall mean roughness average and is measured with either a stylus type Perthometer or laser method. It is the arithmetical mean of all areas of the roughness profile values measured in a sample. Details may be found in standard methods DIN 4762, 4768 or ISO 4287/1.

"Polymer" shall include oligomers, homopolymers, copolymers and interpolymers

Telecentric shall refer to a waveguide in which central transparent core is essentially horizontal to the viewing plane.

Non-telecentric wavegudies shall refer to a waveguide in which the central transparent core is at an angle to the viewing plane.

Lightness (L*) shall mean the brightness of an area judged relative to the brightness of a similarly illuminated area that appears to be white or highly transmitting. It is perceptual response to luminance. It is defined by CIE as a modified cube root of luminance.

$$L^* = 116 \times (Y/Yn)^{1/3} - 16 \text{ for } Y/Yn > 0.008856$$

$Yn$ is the luminance of the white reference $Y$ approximates perceived lightness Luminous flux refers to the lightness of a sample. It is a quantitative expression of the lightness of a source of visible light, which is electromagnetic energy within the wavelength range of approximately 390 nanometers nanometers (nm) to 770 nm. This quantity is measured in terms of the power emitted per unit solid angle from an isotropic radiator, a theoretical point source that radiates equally in all directions in three-dimensional space.

The waveguide of this invention has a light inlet surface and a viewing surface comprising stacked core layers separated by clad layers that form channels capable of reflecting light internal to the core. Additionally there is a smoothing layer on at least one of the light inlet surface or the viewing surface. In the most preferred embodiment both the inlet and viewing surface have a smoothing layer. The smoothing layers provide an improvement in the light viewability of the waveguide. It is desirable to provide a very smooth surface to minimize light scattering that reduces hazy images. Typically either the light inlet or viewing surfaces may have a surface roughness average of less than 1 Ra. Typically surfaces that are rougher than 1 Ra appear rough and start to scatter light. In another embodiment of this invention the surface roughness of the smoothing layer on light inlet and or the viewing surface may have a roughness of between 0.001 and 0.5 Ra. Roughness values below 0.001 are difficult to measure and provide limited improvement for the time and effort required to render the surface that smooth while roughness greater than 0.5 Ra may cause some light interference.

When providing waveguides with a smoothing layer on the light inlet and or the viewing surfaces, it is desirable to closely match the refractive index of the smoothing layer with that of the waveguide core. Typically it is desirable to a refractive index match so the difference between the smoothing layer and the waveguide layer is less than ±0.1. Above ±0.1, some light refraction may occur that will impact the viewing of the image while a refractive index of 0 indicates a perfect match to the core.

In order to form the waveguide useful in this embodiment, it is desirable to use an epoxy formulation or a radiation curable polymer to form the smoothing layer. These materials provide good adhesion to the light inlet and viewing surfaces and do not shrink when cured; therefore they provide an excellent means of smoothing an otherwise rough surface. Furthermore the refractive index of these materials can be adjusted to match the refractive index of the waveguide core polymer.

During the application of these materials it is desirable to provide a liquid smoothing material that has enough fluidity to self level but not too low in viscosity such that it runs off the surface and causes problems. It should be noted that higher viscosity material may require a mechanical assist to provide the desired amount of leveling. Such a mechanical assist may include a blade, roller, air jet impingement, vibration, pressing a flat smooth release sheet onto the liquid smoothing material or by attaching a light directing film to the surface. In an embodiment of this invention, the liquid epoxy may have a viscosity of at least 300 cps at the time of application to the light inlet and or light viewing surfaces. Below 300 cps, the liquid becomes progressively more fluid and may run off the surface and cause problems. Once the liquid epoxy has been leveled, it should be fully crosslinked to assure that the smoothing layer is sufficiently adhered to the surface and hardened. Heat may be used to facilitate the cure of epoxy formulations.

An example of useful epoxies includes bisphenol A/epichlorohydrin based resins. These materials provide good adhesion to the light inlet and viewing surfaces and the epoxy may be mixed with a reactive diluent in order to adjust the viscosity.

In a further embodiment of this invention the smoothing layer may contain radiation curable materials such as, for example, acrylates, or epoxy modified acrylates. These materials are desirable because of their ability to adhere to the light inlet and viewing surfaces as well as their ability to be fully crosslinked in a relatively short time frame Whether epoxies or radiation curable materials are used, it is desirable to have a smoothing layer thickness that provides an optically smooth surface. Therefore the starting roughness of the waveguides light inlet surface or viewing surface may impact the total thickness of the smoothing layer. If there is no preparation of the inlet or viewing surfaces by grinding and or polishing, it may be useful to apply and harden more than one smoothing layer on the same light inlet or viewing surface. This may help to prevent long wavelength roughness that appears as a non-flat or wavy surface. If the surface is ground and polished prior to the application of a smoothing layer, less material may be used. In this case, filling the micro rough surface or scratches may only entail a layer that fills the scratch and levels the surface contour to the highest point on the light inlet or viewing surface. In other words there may not be a continuous layer on the surface. A non-continuous filler that provides a level contour for optical purposes is also considered a smoothing layer.

Typical useful embodiments of this invention may have a smoothing layer thickness of less than 200 micrometers. While thicker layers may provide acceptable smoothness, there is little or no added benefit and if the layer is too thick it may cause some viewing problem because the light from one channel may cross over into an adjacent channel because there is no clad layer to reflect it back into the core.

The smoothing layer may have a luminous flux of between 70 and 99%. By providing high luminous flux, there is little or no loss of light through the waveguide and the image is clear and sharp.

Since the smoothing layer is suitably an epoxy or radiation curable material, it may also provide adhesion to a film sheet such as a light directing film or diffusion film. Light directing films are useful in providing vertical and viewing gain on the viewing side or changing the angle of the light in the inlet side of the screen.

Useful materials for the core may be selected from the group consisting of polyolefin, polyester, polycarbonate, polyamide, polymethylmethacrylate, and their copolymer derivatives and glass. Almost any clear polymer that has minimal or no color absorption may be used. In one embodiment the waveguide has a core of polycarbonate. Polycarbonate is desirable because it provides good optical luminous flux and does not absorb much light. Polymethlymethacrylate is also useful has a waveguide core material because of it excellent optical luminous flux properties. Glass may also be used as a waveguide core material useful in this invention.

In a further embodiment of this invention, the clad layer may have a refractive index that is lower than that of the core material. This is useful in waveguides to aid in the total internal reflection of light back into and through the core. There may be one or more clad layers and in order to provide a means of stacking and fusing them together, it may be desirable to have the outer most clad layer also provide some adhesion to the next waveguide. To minimize ambient light problems, it may also be desirable to have at least one layer that is opaque. An opacifying agent in the clad layer is the most useful method for ambient light absorption and to prevent light within one waveguide channel from moving into the next channel.

In other useful waveguide embodiments, the core may have a gradient refractive index. Such waveguides are useful to minimize light loss and scattering problems. When using a gradient refractive index core, the smoothing layer on the inlet and the viewing surfaces is difficult to match and therefore it may be useful to provide a layer that has a refractive index that is an average of the refractive indexes of the core vertical dimension.

In a further embodiment of this invention, the waveguide is flat and planar and may be used as a display screen. Stacked planar waveguides form good display screens because their transparent central cores have a high level of luminous flux. The method of the invention includes making a waveguide having a light inlet surface and a viewing surface comprising stacked core layers separated by clad layers to form channels and bearing a smoothing layer on at least one of the light inlet surface or the viewing surface. A curable polymer as described above may be applied to the inlet surface and allowed to level in a liquid form. This may be self-leveling or mechanically assisted in some form as described above. The polymer is cured until it fully hardens and a second curable polymer layer is applied to the viewing surface that is also applied in a liquid form and cured until it filly hardens. One or more layers may be applied to each side depending on the initial roughness of the stacked waveguide. In a separate embodiment the light inlet and/or viewing surfaces may be ground and polished prior to the application of the liquid radiation curable smoothing layers. In another embodiment after the liquid radiation curable polymer is applied to the light inlet or the viewing surface, a preformed smooth release sheet is applied over the top of the liquid material by pressing or laminating it to the liquid material. After curing the preformed smooth release sheet is then removed to provide a very smooth surface. This step may be repeated on each side of the waveguide.

In another embodiment, instead of applying a preformed smooth release sheet that is removed after the radiation curable layer is cured, a light directing or light shaping film is applied to the liquid smoothing layer and the layer is cured until it fully hardens.

As indicated, a waveguide contains a transparent polymeric central core that is clad externally with one or more polymeric layers. It should be noted that for a waveguide to reflect light back into the core and therefore transmit it through the length of the waveguide with minimal loss, the refractive index of the clad layer should be lower than the refractive index of the central core. By placing layered particles that have a thickness dimension of between 0.5 and 10 nm, it has been demonstrated that the refractive index of the polymer may be reduced. This is useful for matching the refractive index of two different polymers. It should also be noted that other inorganic or organic materials may be added to the smoothing layers or the transparent core to adjust the refractive index to assure a closer match.

In a further embodiment of this invention the core is planar in shape. By providing a sheet-like waveguide this invention may be used as a rear projection screen. Light from a projection source may be directed into the core of the waveguide either directly or by use of a light director such as a Fresenl lens or a light directing shape such triangular right angle reflector as sold by 3M company under the tradename VIKUITI. It should also be noted that typical rear projection screens may have a diffusion screen or light shaper on the viewing side to optimize the viewing angle of the screen in either the vertical and or horizontal viewing planes.

In general, the choice of the binder polymer in the clad layer may depend on the choice of the core. As a rule of thumb, the binder polymer in the clad should be the same or similar to the polymer in the core to ensure good adhesion, although exceptions to this rule may abound. The layered particles when dispersed in the binder polymer of the clad, reduces its refractive index, without significantly altering its adhesion to the core. The choice of the core material depends on a number of criteria: the optical properties such as refractive index and transparency, physical properties, dimensional stability, ease of manufacture, availability, cost and the like. Core material can comprise a cellulose derivative such as cellulose acetate or cellulose acetate butyrate, or polyesters, including amorphous or crystalline polyesters such as polyethylene terephthalate, and polyethylene naphthalate, mainly because of their excellent optical properties, availability, and relatively low cost. Preferred binder polymers in the clad layer for a cellulosic core, are cellulose derivatives such as carboxymethyl cellulose, hydroxyethyl cellulose, cellulose acetate, and cellulose acetate butyrate. Similarly, preferred binder polymers in the clad layer for a polyester core are polyesters such as polyester ionomers.

The flat planar waveguides useful in this invention may have a transparent central core and clad layer that have a thickness ratio of from 20:1 to 5:1. A thickness ratio of from 20:1 to 5:1 provides excellent viewability by providing enough open area for viewing yet enough thickness in the clad to absorb ambient room light. While a core to clad ratio greater than 20:1 is useful, the clad becomes sufficiently thin such that the ambient room light is reduced making the screen less desirable. When the core to clad thickness ratio is greater than 5:1, the percent open area is reduced and the opaque clad will then to interfere with the screen's viewability.

The waveguide may have a transparent central core that comprises at least one material selected from the group consisting of polyester, cellulose acetate, polycarbonate, polymethylmethacrylate, cyclic olefins and copolymers thereof. These materials are useful because they have excellent optical properties and will transmit light with minimal distortion or absorption of light. To provide good viewing characteristics the transparent central core should have a luminous flux of between 70 to 99. Luminous flux percent less than 70% tend to absorb or scatter more light and will reduce the overall brightness of the waveguide. The core may be provided with a primer or tie layer to enhance adhesion of the clad layer on to the core.

In order for a waveguide to transmit light, the clad needs to have a refractive index less than that of the core. The transparent central core and clad layers may have a refractive index difference of from 0.001 to 0.35. In a preferred embodiment of this invention the transparent central core and clad layers have a refractive index difference of from 0.01 to 0.30. A refractive index difference between core and clad of less than 0.01 provides a very narrow acceptance angle for incoming light and will only transmit light through the central core that enters in a very narrow angle. While this may be useful for absorbing ambient room light, it also requires that light from image projection source be directed into the waveguide in a very narrow angle. Without the use of a Fresenl or other type light director, the light source needs to be aligned in a narrow field in order for light to be viewed. On the other hand if the refractive index difference between the transparent central core and one or more clad layers is greater than 0.30, the waveguide will accept light from a broader source and transmit in back into the rear projection screen where it will bounce around and may reenter the waveguide from the projection side of the screen.

The waveguide may have a transparent central core and one or more clad layers with a refractive index of from 1.0 to 2.4. Central cores and clad layers with a refractive index of from 1.0 to 2.4 provide a wide choice of materials that may provide optimum performance of the waveguide screen. Typically materials with a refractive index of less than 1.0 are not readily available while materials with a refractive index of greater than 2.4 are expensive and have limited usefulness as a waveguide. Other materials may be added to the core, clad layers or smoothing layers to modify the refractive index of the that layer. Such materials may include layer particles with at least one dimension in the range of 10–40 nm, or fluropolymer.

The following examples illustrate the practice of this invention. They are not intended to be exhaustive of all possible variations of the invention. Parts and percentages are by weight unless otherwise indicated.

EXAMPLES

The materials used in the examples and comparative samples of the invention include the following.

Example of Waveguide Component

A waveguide component as per the present invention is constructed as follows.

The core of the waveguide component comprises a ~254 $\mu$M thick polycarbonate clear base. On each side of the polycarbonate base is coated a ~3 µm thick (dry) clad layer comprising an epoxy resin (EPON 1009F) manufactured by Shell. The coating is made from a solution in 2-butanone, using a fixed-slot extrusion hopper, and thoroughly dried. A second coating layer was applied on top of each side the EPON clad which serves as an adhesive layer. This layer is approximately 4.5 µm thick. The layer consists of VITEL 2700 polyester (supplied by Bostik) with a black dye (Solvent Black 27) mixed in at approximately 12.5% of the solids. The optical density of the layer is approximately 0.8 as measured by X-rite densitometer. The coating is made from a solution in 2-butanone, using fixed-slot extrusion hopper, and thoroughly dried.

The coated web was slit into 0.25 inch thick webs. The web was chopped to a length of approximately 6000 mil long and a vertical stack assembled. The stack was clamped and placed in an oven at 93° C. for four hours. The fused stacked waveguide screen was removed from the oven and allowed to cool to room temperature. On both the inlet side and the viewing side, a layer of two-part epoxy was coated and cured. The epoxy formulation was mixture of epoxy resin and curing agent.

A series of liquid epoxy resins, manufactured by the Shell Chemical Company, were selected for initial evaluation. Each of these are bisphenol A/epichlorohyrin based resins and are of low color (ASTM D-1544-80, Gardner Color Scale of less than 1). These base resins are listed in Table 1 by increasing viscosity.

TABLE 1

Epoxy Resins Selected for Evaluation

| EPON Resin | Viscosity (poise) | Diluent | Epoxide Equivalent Weight |
|---|---|---|---|
| 815 | 5–7 | butyl glycidyl ether | 175–195 |
| 813 | 5–7 | cresyl glycidyl ether | 180–195 |
| 8132 | 5–7 | NEODOL glycidyl ether | 195–215 |
| 8201 | 50–65 | cresyl glycidyl ether | 180–195 |
| 8280 | 110–150 | | 185–195 |
| 830 | 170–225 | | 190–198 |

Each of the low viscosity resins contains a reactive diluent in order to achieve a viscosity of less than 100 poise.

A series of amine curing agents, also manufactured by the Shell Chemical Company were selected for compounding with the EPON resins. These also exhibit low color (Gardner Color Scale of less than 1) and provide a range of viscosity. They are listed in Table 2.

TABLE 2

Curing Agents Selected for Evaluation

| EPICURE Curing Agent | Type | Viscosity (cps) | Equivalent Weight |
|---|---|---|---|
| 3223 | aliphatic amine | 10 | 20.7 |
| 3373 | cycloaliphatic amine | 25–30 | 87 |
| 3381 | cycloaliphatic amine | 50–100 | 95 |

The equivalent weight listed indicates the amount required to react with one mole epoxide. The 6×3 matrix of combinations was prepared using the recommended concentration of curing agent. A 50-gram batch of each was prepared, mixed thoroughly, poured out on a polycarbonate plate and allowed to cure for 24 hours at room temperature. The color, clarity, hardness and adhesion were then evaluated. The formulation producing the best combination of properties is EPON 815 with EPICURE 3373. This mixture produced a clear, colorless, hard coating with good adhesion to polycarbonate. It also provides one of the lowest viscosities of the combinations tested. Although not measured, it is expected to have a mixture viscosity of less than 500 cps.

The epoxy mixture was coated on one side and allowed to cure for 24 hours at room temperature. The opposite side was coated with the same epoxy formulation and cured in a similar manner. The sample was then measured for luminous flux properties. The coating layer thickness was not measured but was applied to achieve a visually smooth layer. In general this layer was approximately 1–5 mils thick. In general the rougher the surface on the waveguide, the thicker the coating layer required to get a smooth surface.

Sample 1

This was an assembled waveguide as described above with no smoothing layer on either side. The surface was ground with 240 grit sand paper followed by hand sanding with 320 grit wet sandpaper.

Sample 2

Same as the control but both sides were coated with a smoothing epoxy layer after grinding.

Sample 3

This was an assembled waveguide as described above with no smoothing layer on either side. The surface was ground with 180 grit sand paper. No smoothing coats were applied.

Sample 4

This was the same as sample 2 except a smoothing coat was applied to both sides

Sample 5

This sample was prepared initially grinding with 240 grit and 320 grit paper. This was followed with a 400 grit wet sandpaper Sample 6

Same as 4 except both sides were coated with a smoothing layer

Sample 7

Same as control but inlet side was coated with a smoothing layer. No coating on the view side.

Sample 8

Same as the control except the viewing side was coated with a smoothing layer. No coating on the inlet side.

Sample 9

This sample was prepared the same as the control but a smoothing layer was applied to each side and a smooth sheet of polyester (PET) film was applied to the liquid epoxy by using a small rubber roller and pushing it into the liquid. The epoxy was cured and the PET film was removed.

Each sample was then measured for surface roughness and luminous flux (L*). The samples were also visually assessed for overall surface waviness and appearance.

TABLE 3

| Sample | | Roughness (Ra- Micro inches) | Clarity | L* | Gloss 20 Degree | Viewing Surface Assessment |
|---|---|---|---|---|---|---|
| Sample1 (control for sample 2, 7, 8 and 9) | Inlet | 1.23 | 6 | 67.6 | 1 | Rough and diffuse surface |
| | View | 1.24 | 6 | 67.0 | 1 | |
| Sample2 (Smoothing Ctg) | Inlet | 0.076 | 2 | 80.2 | 83 | Smooth on both sides |
| | View | 0.059 | 2 | 80.0 | 83 | |
| Sample 3 (Control for sample 4) | Inlet | 2.16 | 7 | 59.9 | 0 | Very Rough on both sides |
| | View | 2.47 | 7 | 60.0 | 0 | |
| Sample 4 (Smooth ctg) | Inlet | 0.05 | 2 | 74.2 | 75 | Smooth |
| | View | 0.03 | 2 | 75 | 82 | |
| Sample 5 (Control for sample 6) | Inlet | 0.27 | 5 | 69 | 3 | Diffuse |
| | View | 0.28 | 5 | 70 | 3 | |
| Sample 6 (coated both side) | Inlet | 0.068 | 2 | 82 | | Smooth but wavy surface |
| | View | 0.043 | 2 | 83 | | |
| Sample 7 (Ctg on inlet) | Inlet | 0.07 | * | 80 | 82 | Smooth inlet but rough view side |
| | View | 1.24 | 6 | 69 | 1 | |
| Sample 8 (Ctg on view side) | Inlet | 1.23 | * | 69 | 1 | Rough inlet but smooth view side |
| | View | 0.06 | 4 | 79 | 88 | |
| Sample 9 (Release layer) | View | 0.02 | * | * | 83 | Glass like surface on both sides |
| | Inlet | 0.01 | 1 | 85 | 90 | |

*Sample not measured or evaluated
Clarity was a visual assessment of 1–7 with higher number being worse. Black printed text in 12 font on white copier paper was placed under the waveguide and a visual assessment was made on the apparent clarity and sharpness of the image by allowing room light to illuminate the image under the waveguide.
1—excellent clarity and sharp image
2—very good clarity and sharpness
3—good clarity and sharpness
4—fair clarity and sharpness
5—poor clarity and sharpness
6—very poor clarity and sharpness
7—unreadable As can be seen from the data in the above Table 1, sample 1, sample 2 and sample 4 (all controls) were made by stacking and fusing strips of polycarbonate sheet together to form a screen. The surface was ground with a belt sander and or additional hand smoothing with finer grits to provide three different surface roughness. The surface roughness was measured on each side of the waveguides. When comparing these data it is noted that the rougher surfaces have poorer clarity, lower L* and lower gloss values. Samples 2,4 and 6 demonstrate the benefit of providing a smoothing layer on the rough surfaces. As can be seen in all cases the surface roughness is greatly improved when compared to the roughness of their respective controls. The clarity data indicates that in all cases the smoothing layer was able to dramatically improve the visual clarity of the image as well as improving the L* and gloss of the samples. The starting roughness appears to have little impact on the screen's performance. This further indicates the value of providing a smoothing layer to improve the performance of the waveguide screen. Samples 7,8 and 9 started with a ground roughness of sample 1 but in sample 7, only the inlet side of the waveguide was coated with a smoothing layer. The data indicates that providing a smoothing layer on the inlet side has little impact on the clarity of the image as well as the L* and gloss when viewed from the viewing side. Sample 7 starts off with the same roughness as sample 1 but when the viewing side is provided with a smoothing layer, the clarity of the image is greatly improved as well as the L* and gloss. Sample 9 has a smoothing layer applied to inlet and the viewing sides but while the epoxy is still liquid a smooth release sheet is applied to the surface and then the epoxy is cured. When the release sheet is removed a very smooth surface (noted by the Ra number) is developed that provides the best image clarity, L* and gloss.

The roughness data (Ra) was obtained using a diamond stylus Perthometer made by Mahr according to ISO standard 4288:1996 and ISO 4288:1985. The L* was measured by on Hitachi Spectrophotometer The gloss was measured On a portable Gardner gloss meter using ASTM D-523-89 method. The visual data was a qualitative assessment as describe above.

PARTS LIST

11—stepped waveguide
12—clad layer that has a lowered refractive index than the core and also is opaque and contains an adhesive
14—transparent core
16—a layer that has a lower refractive index than the core and also is opaque and contains an adhesive.
31—view side of waveguide screen
32—top clad/adhesive layer
33—stack of several waveguides
34—top clear clad with lower refractive index than core
35—light ray coming from the projection side of the waveguide screen
36—transparent central core
37—light directing film adhered to the light inlet side of the stacked waveguide
38—bottom clear clad
39—stacked waveguide rear projection screen
40—bottom clad cap with adhesive
42—light shaping film adhered to the light viewing side of the stacked waveguide 44—leveling layer on the light viewing side of stacked waveguide
46—leveling layer on the light inlet side of stacked waveguide
50—an epoxy or UV curable leveling layer
51—waveguide with rough surface
52—rough surface of the waveguide
60—magnified roughness of the transparent core
61—stepped waveguide with core and clad layers
62—smoothing layer with the same refractive index as the core
64—clear clad layer that has a lower refractive index than the core 68
66—clad cap layer that contains black opaque material that acts as an adhesive
68—transparent core
70—light ray traveling through the transparent core
81—magnified section of the waveguide core
80—rough surface section
82, 84, 86—segments of refracted light ray 88 as it exits the rough surface
88—light ray traveling through the core and refractive segments
90—transparent core of a waveguide
91—representation of a waveguide with scratches and digs with a non-continuous leveling layer
92, 94—scratches that are filled with a non-continuous leveling method

What is claimed:

1. A waveguide having a light inlet surface and a viewing surface comprising stacked core layers separated by clad layers to form channels and bearing a smoothing layer on at least one of the light inlet surface or the viewing surface thereof.

2. The waveguide of claim 1 wherein said smoothing layer comprises epoxy.

3. The waveguide of claim 2 wherein said epoxy is essentially fully crosslinked.

4. The waveguide of claim 1 wherein said smoothing layer further comprises material to modify its refractive index.

5. The waveguide of claim 4 wherein said material comprises at least one material selected from the group consisting of fluorinated polymer and transparent inorganic particles.

6. The waveguide of claim 1 wherein said surface bearing a smoothing layer is a light inlet surface.

7. The waveguide of claim 6 wherein said light inlet smoothing layer further provides adhesion to a light directing film.

8. The waveguide of claim 1 wherein said smoothing layer comprises a radiation curable compound.

9. The waveguide of claim 1 wherein said surface bearing a smoothing layer has a surface roughness of less than 1 Ra.

10. The waveguide of claim 1 wherein said surface bearing a smoothing layer has a roughness of between 0.001 and 0.5 Ra.

11. The waveguide of claim 1 wherein said inlet smoothing layer has a thickness of less than 200 micrometers.

12. The waveguide of claim 1 wherein said waveguide has a luminous flux of between 70 and 99%.

13. The waveguide of claim 1 wherein said smoothing layer further provides adhesion to a light directing film.

14. The waveguide of claim 1 wherein said surface bearing a smoothing layer is a light viewing surface.

15. The waveguide of claim 1 wherein said smoothing layer has a refractive index that is within ±0.1 different from the refractive index of the core layer.

16. The waveguide of claim 1 wherein said smoothing layer comprises at least one material selected from the group consisting of epoxy and a radiation curable polymer.

17. The waveguide of claim 1 wherein said core layers comprise one material selected from the group consisting of polyolefin, polyester, polycarbonate, polyamide, polymethylmethacrylate, and their copolymer derivatives and glass.

18. The waveguide of claim 1 wherein said core layers comprise a polycarbonate polymer or copolymer.

19. The waveguide of claim 1 wherein said core layers comprise a polymethlymethacrylate compound.

20. The waveguide of claim 1 wherein said core layers comprise a glass.

21. The waveguide of claim 1 wherein said core layers have a gradient refractive index.

22. The waveguide of claim 1 wherein said clad layers are opaque.

23. The waveguide of claim 1 that is a planar waveguide.

24. The waveguide of claim 1 that is a fiber waveguide.

25. A display screen comprising the wavequide of claim 1.

* * * * *